United States Patent
Schut

(10) Patent No.: US 9,555,743 B2
(45) Date of Patent: Jan. 31, 2017

(54) DRIVER LIFT DEVICE

(71) Applicant: Roy A. Schut, Brookings, SD (US)

(72) Inventor: Roy A. Schut, Brookings, SD (US)

( * ) Notice: Subject to any disclaimer, the term of this patent is extended or adjusted under 35 U.S.C. 154(b) by 3 days.

(21) Appl. No.: 14/719,489

(22) Filed: May 22, 2015

(65) Prior Publication Data

US 2016/0339842 A1 Nov. 24, 2016

(51) Int. Cl.
*B60R 3/02* (2006.01)

(52) U.S. Cl.
CPC ..................................... *B60R 3/02* (2013.01)

(58) Field of Classification Search
None
See application file for complete search history.

(56) References Cited

U.S. PATENT DOCUMENTS

| | | | | |
|---|---|---|---|---|
| 2,640,612 A * | 6/1953 | Barry | ................... | B60P 1/4421 414/545 |
| 2,706,565 A * | 4/1955 | Krasno | ................. | B60P 1/4421 414/545 |
| 2,823,813 A * | 2/1958 | Shimmon | ............. | B60P 1/4421 414/541 |
| 3,024,926 A * | 3/1962 | Nolden | ................. | B60P 1/4421 414/545 |
| 3,282,449 A * | 11/1966 | Buford | .................. | B60P 1/4421 187/365 |
| 3,520,426 A * | 7/1970 | Hostetler | ............. | B60P 1/4421 414/545 |
| 3,675,739 A * | 7/1972 | Erlinder | ................ | B60P 1/4421 187/240 |
| 3,877,590 A * | 4/1975 | Brown | .................. | B60P 1/4421 187/244 |
| 3,887,092 A * | 6/1975 | Leet | ...................... | B60P 1/4421 187/243 |
| 4,071,260 A | 1/1978 | Marshall, Sr. | | |
| 4,133,437 A * | 1/1979 | Gates | .................... | B60P 1/4428 187/200 |
| 4,243,120 A * | 1/1981 | Pratt, Jr. | .................. | B60R 3/02 182/127 |
| 4,252,492 A * | 2/1981 | Scothern | ................... | B66F 7/04 187/244 |
| 4,324,317 A | 4/1982 | Winkelblech | | |
| 4,353,436 A * | 10/1982 | Rice | ....................... | A61G 3/062 187/200 |
| 4,563,121 A * | 1/1986 | Drews | .................. | B60P 1/4421 187/243 |
| 4,806,062 A * | 2/1989 | Stier | ...................... | B60P 1/4421 292/126 |
| 4,915,573 A * | 4/1990 | Wapner | ................. | B66B 9/0823 414/540 |

(Continued)

*Primary Examiner* — Katy M Ebner

(57) ABSTRACT

A driver lift device lifts a driver to enter an elevated cab on farm equipment or the like. The device includes an elongated post vertically mounted to a vehicle proximate an entry into a cab of the vehicle. Each of a top end and a bottom end of an elongated pole is coupled to the post such that the pole is positioned in parallel spaced relationship to the post. The pole extends through the tube wherein the tube is slidable along the pole. A foot support coupled to the tube. A winch is coupled to the top end of the pole and a cable is coupled to and extends between the winch and the tube such that operation of the winch elevates and lowers the foot support on the pole.

16 Claims, 4 Drawing Sheets

(56) References Cited

U.S. PATENT DOCUMENTS

| | | | | |
|---|---|---|---|---|
| 5,064,022 A * | 11/1991 | Graham | ............... | B60R 3/02 |
| | | | | 182/127 |
| 5,092,617 A * | 3/1992 | Jones, Jr. | ............... | B60R 3/02 |
| | | | | 187/273 |
| 5,145,031 A * | 9/1992 | Sprunger | ............... | E06C 7/16 |
| | | | | 182/103 |
| 5,176,486 A * | 1/1993 | Park | ............... | B60P 1/4421 |
| | | | | 296/51 |
| 5,234,311 A * | 8/1993 | Loduha, Jr. | ............... | A61G 3/06 |
| | | | | 414/546 |
| 5,382,130 A * | 1/1995 | Kempf | ............... | A61G 3/06 |
| | | | | 14/71.3 |
| 5,513,943 A * | 5/1996 | Lugash | ............... | B60P 1/4421 |
| | | | | 187/244 |
| 5,529,453 A * | 6/1996 | La Gois | ............... | B60P 1/4421 |
| | | | | 254/280 |
| 5,755,309 A | 5/1998 | Harman et al. | | |
| 6,027,131 A | 2/2000 | Wijlhuizen | | |
| 7,380,769 B1 * | 6/2008 | Dorris | ............... | B60P 1/4407 |
| | | | | 254/323 |
| 7,546,902 B2 | 6/2009 | Schwertner | | |
| 7,806,647 B2 * | 10/2010 | Gomes | ............... | B60P 1/4421 |
| | | | | 414/545 |
| 8,011,474 B2 | 9/2011 | Boroski et al. | | |
| 8,308,177 B2 | 11/2012 | Fravel et al. | | |
| 8,668,048 B1 | 3/2014 | Morris | | |
| 9,028,195 B1 * | 5/2015 | Heynssens | ............... | B60P 1/4428 |
| | | | | 414/545 |
| 2004/0154870 A1 * | 8/2004 | Bass | ............... | B66B 7/02 |
| | | | | 187/270 |

* cited by examiner

DRIVER LIFT DEVICE

BACKGROUND OF THE DISCLOSURE

Field of the Disclosure

The disclosure relates to lift devices and more particularly pertains to a new lift device for lifting a driver to enter an elevated cab on farm equipment or the like.

SUMMARY OF THE DISCLOSURE

An embodiment of the disclosure meets the needs presented above by generally comprising an elongated post vertically mounted to a vehicle proximate an entry into a cab of the vehicle. Each of a top end and a bottom end of an elongated pole is coupled to the post such that the pole is positioned in parallel spaced relationship to the post. The pole extends through the tube wherein the tube is slidable along the pole. A foot support coupled to the tube. A winch is coupled to the top end of the pole and a cable is coupled to and extends between the winch and the tube such that operation of the winch elevates and lowers the foot support on the pole.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
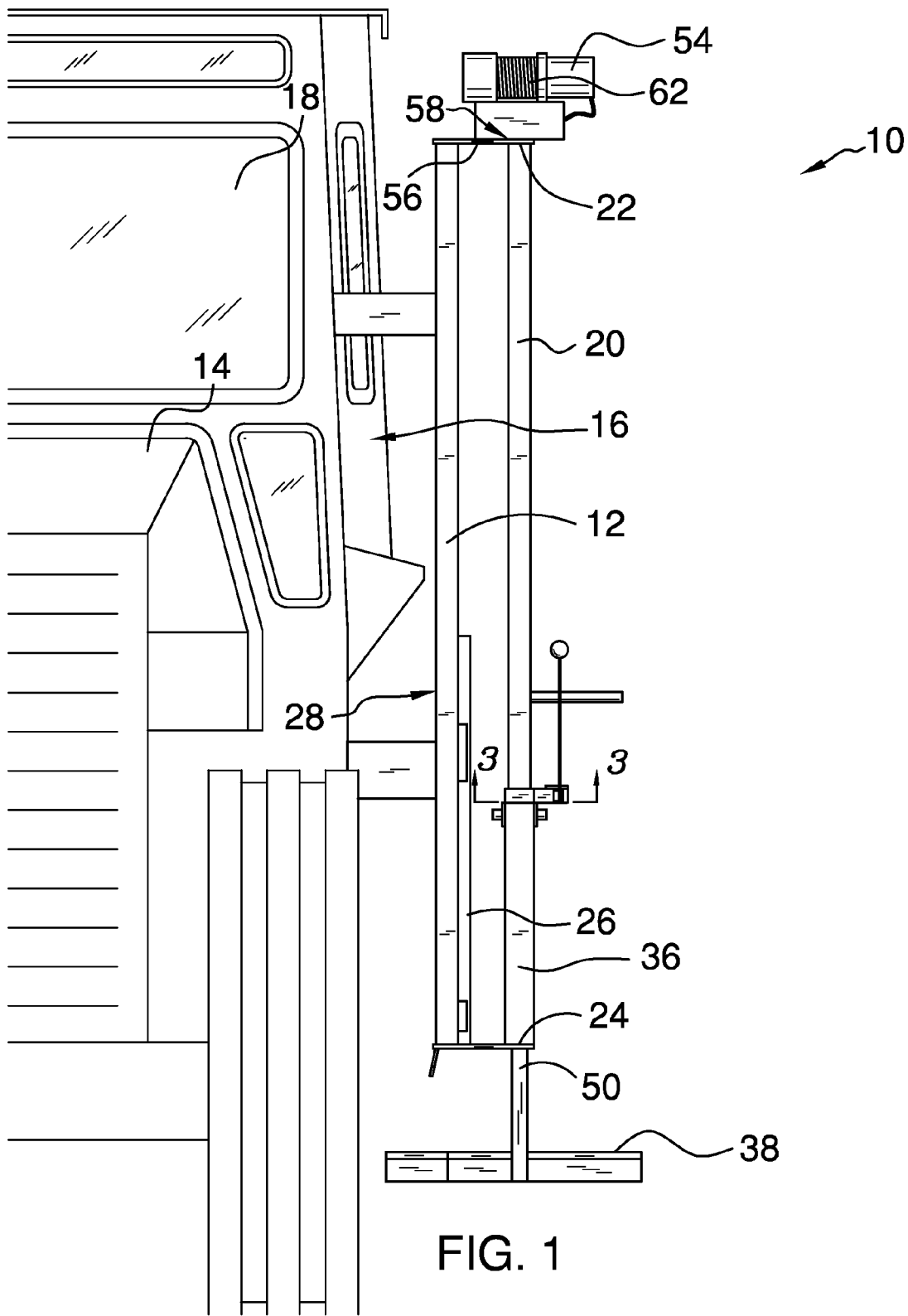
FIG. 1 is a front side perspective view of a driver lift device according to an embodiment of the disclosure.
Figure 2:
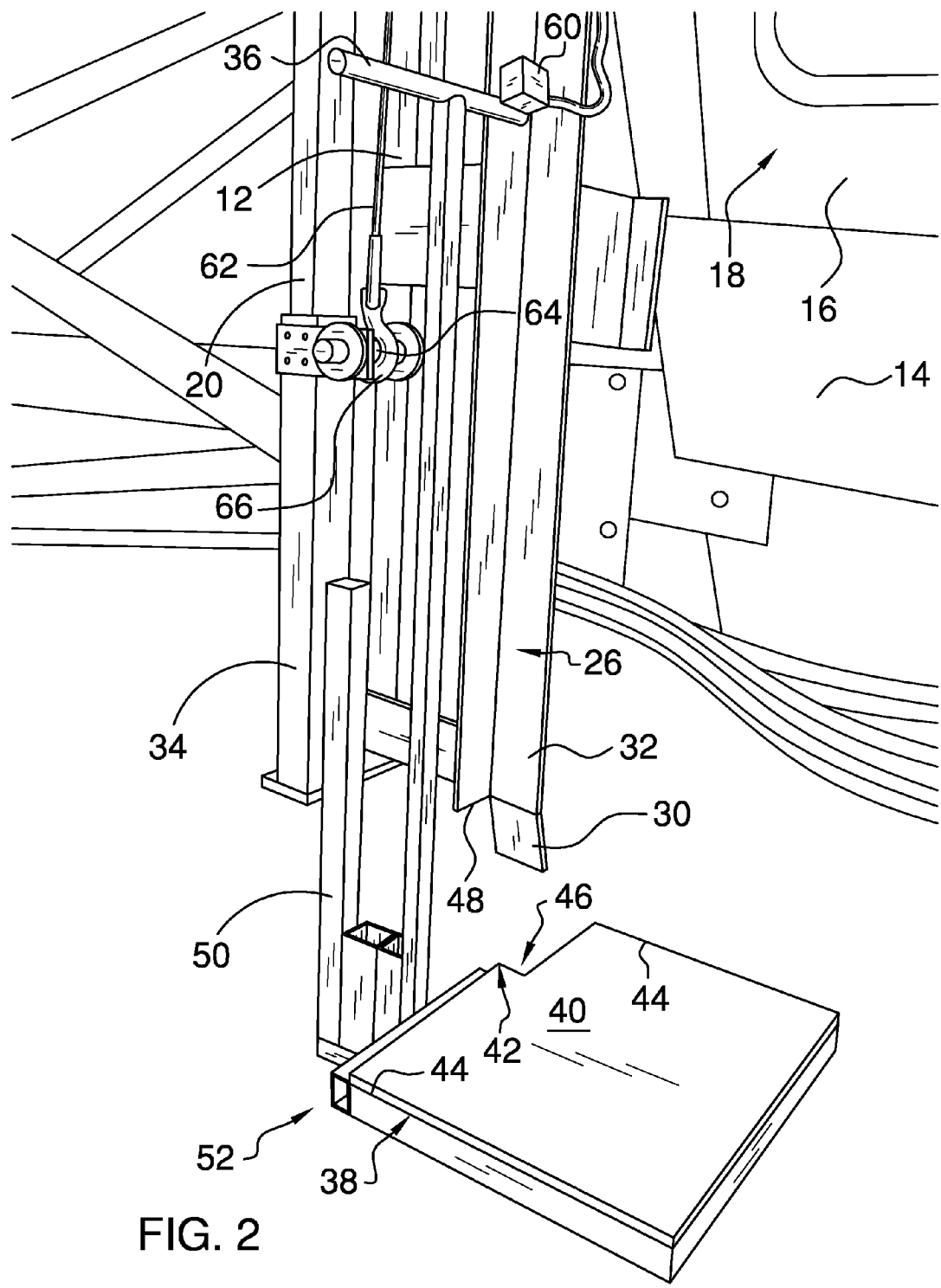
FIG. 2 is a partial back side perspective view of an embodiment of the disclosure.
Figure 3:
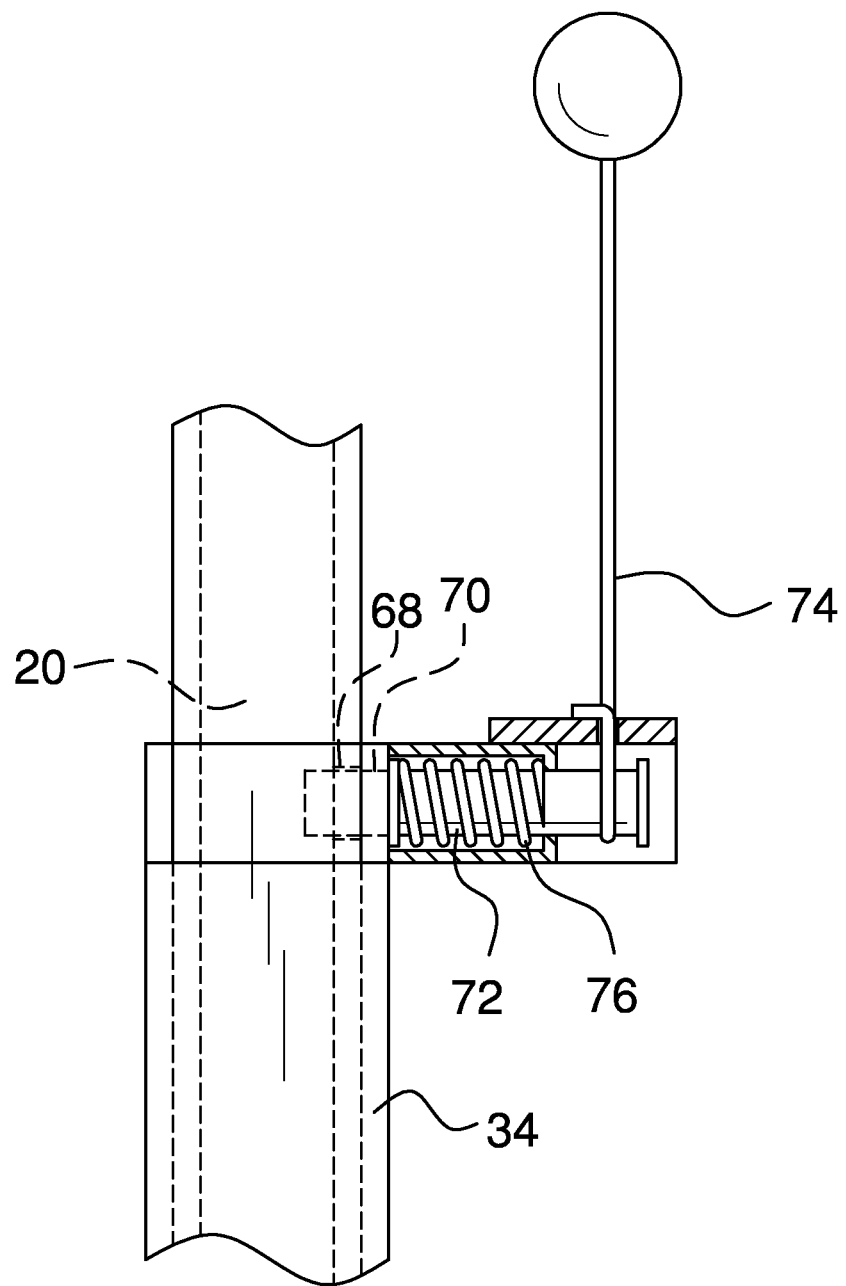
FIG. 3 is a cross-sectional view of an embodiment of the disclosure taken along line 3-3 of FIG. 1.
Figure 4:
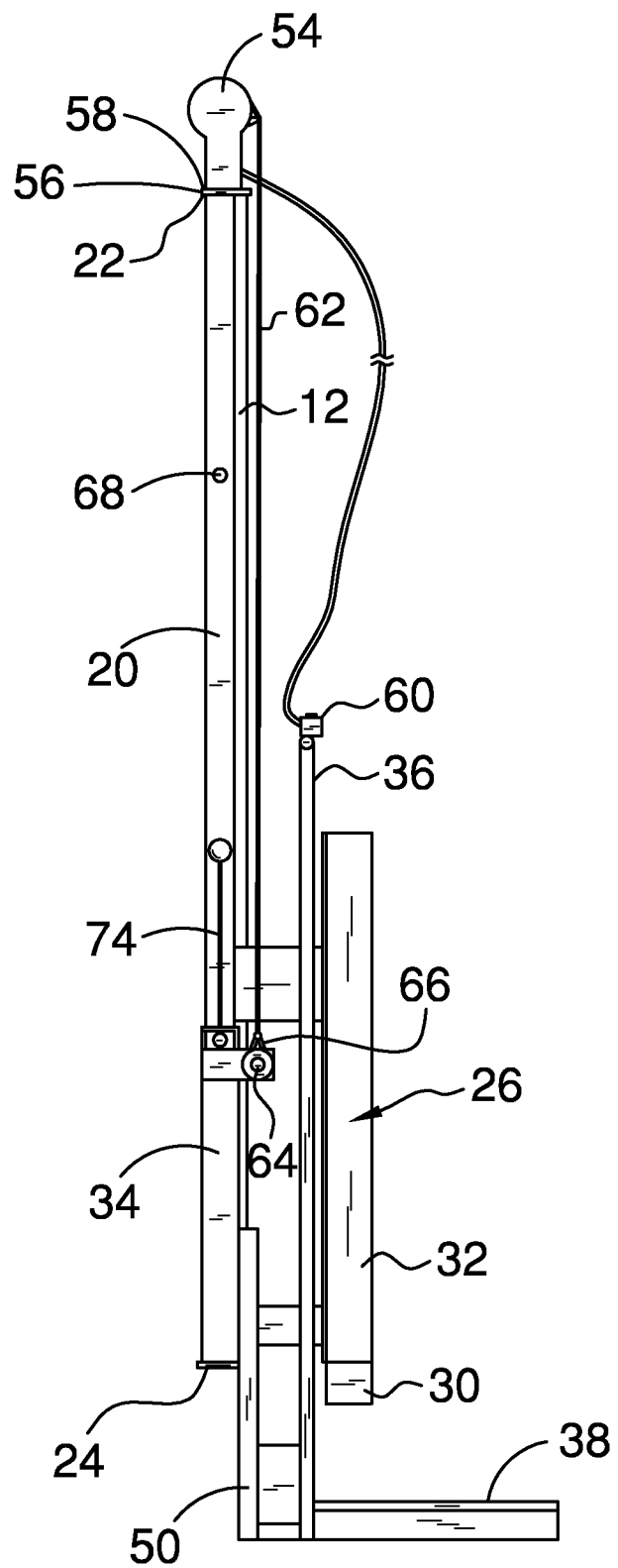
FIG. 4 is a side view of an embodiment of the disclosure.

With reference now to the drawings, and in particular to FIGS. 1 through 4 thereof, a new lift device embodying the principles and concepts of an embodiment of the disclosure and generally designated by the reference numeral 10 will be described.

As best illustrated in FIGS. 1 through 4, the driver lift device 10 generally comprises a post 12 which is elongated wherein the post 12 is configured for being vertically mounted to a vehicle 14 proximate an entry 16 into a cab 18 of the vehicle 14. The vehicle 14 may be a combine or other type of farm equipment having an elevated cab position. An elongated pole 20 has a polygonal cross-sectional shape comprising straight edges and corners when viewed transverse to a longitudinal axis of the pole 20. Each of a top end 22 and a bottom end 24 of the pole 20 is coupled to the post 12 such that the pole 20 is positioned in parallel spaced relationship to the post 12. A brace 26 is coupled to the post 12. The brace 26 is positioned in spaced parallel relationship to the post 12 and the pole 20. The brace 26 is elongated and has a length less than a length of the post 12 such that the brace 26 provides stiffness and support for the post 12. The brace 26 is positioned in alignment with a bottom section 28 of the post 12 such that the brace 26 does not obscure or obstruct a driver's normal view out of the cab 18 of the vehicle 14. The brace 26 has an L-shaped cross sectional shape transverse to a longitudinal axis of the brace 26. The brace 26 has an outwardly directed tab 30 extending from one flange 32 of the brace 26 for reasons to be set forth in greater detail below.

The pole 20 extends through a tube 34 wherein the tube 34 is slidable along the pole 20. The tube 34 has a complementary shape to the pole 20 such that the tube 34 is inhibited from twisting on the pole 20. The polygonal cross-sectional shape is rectangular as both the pole 20 and the tube 34 may be constructed from square tubing. A handle 36 is coupled to and positioned in a fixed position relative to the tube 34 such that the handle 36 moves with the tube 34 along the pole 20. A foot support 38 is coupled to the tube 34. The foot support 38 includes a planar upper surface 40 and a corner 42 inset between opposite side edges 44 of the foot support 38. The corner 42 defines an alignment guide 46 vertically aligned with the brace 26 such that the alignment guide 46 is complementary to and slides along the brace 26 when the tube 34 is elevated and lowered. The foot support 38 is lowerable to a position vertically spaced below a base end 48 of the brace 26 wherein the tab 30 facilitates positioning of the alignment guide 46 relative to the brace 26 as the foot support 38 is elevated towards the base end 48 of the brace 26. An extension 50 is coupled between the foot support 38 and the tube 34 such that the foot support 38 is positioned vertically below the tube 34 and the bottom end 24 of the pole 20 when the tube 34 is in a fully lowered position 52. This structure enhances ground clearance for the device 10 when the tube 34 is elevated on the pole 20.

A winch 54 is coupled to the top end 22 of the pole 20. An upper plate 56 is coupled to and extends between the post 12 and the top end 22 of the pole 20. The winch 54 is coupled to and positioned on a top surface 58 of the upper plate 56. The winch 54 may be motor driven and of a type commercially available. The winch 54 is exposed on the upper plate 56 providing for facilitated repair or replacement of the winch 54 when needed. The winch 54 is provided with a self-braking mechanism. A control 60 is coupled to the handle 36. The control 60 is a toggle switch, or the like, operationally coupled to the winch 54 wherein operation of the winch 54 is controlled by manipulation of the control 60. A cable 62 is coupled to and extends between the winch 54 and the tube 34 wherein operation of the winch 54 selectively elevates and lowers the foot support 38 relative to the pole 20. A bar 64 is coupled to the tube 34 and positioned in spaced relationship to the tube 34 in transverse relationship to the tube 34. A hook 66 is coupled to the cable 62. The hook 66 is removably engageable to the bar 64 wherein the cable 62 is removably coupled to the tube 34 and retraction of the cable 62 by the winch 54 elevates the foot support 38. The hook 66 may be a spring hook or otherwise include a spring loaded gate or the like to prevent inadvertent disengagement of the hook 66 from the bar 64.

A hole 68 extends through the pole 20 proximate the top end 22 of the pole 20. An aperture 70 extends through the tube 34. The aperture 70 is positionable to align with the hole 68 when the tube 34 is elevated. A locking pin 72 is insertable through the aperture 70 and the hole 68 wherein the tube 34 is inhibited from sliding along the pole 20. The locking pin 72 is slidably coupled to the tube 34 in alignment with the aperture 70. The locking pin 72 is biased by a spring 76 to extend towards engagement with the pole 20. A grip 74 is coupled to and extends from the locking pin 72 wherein the grip 74 is configured for facilitating manipulation of the locking pin 72 to slidably disengage from the hole 68 in the pole 20.

In use, the foot support 38 is extended downwardly to allow a person to comfortable step onto the foot support 38. The person then manipulates the control 60 to elevate the foot support 38 and lift the person to a position where they can comfortably enter the cab 18 of the vehicle 14. The tube 34 and foot support 38 are held in the elevated position during use of the vehicle. Upon exiting the cab 18, the person manipulates the grip 74 allowing for lowering of the tube 34 and foot support 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A driver lift device comprising:
   a vehicle having an entry into a cab;
   a post, said post being elongated, said post being vertically mounted to said vehicle proximate said entry into said cab of the vehicle;
   a pole, said pole being elongated, a top end and a bottom end of said pole each being coupled to said post such that said pole is positioned in parallel spaced relationship to said post;
   a tube, said pole extending through said tube wherein said tube is slidable along said pole;
   a foot support coupled to said tube;
   a winch coupled to said top end of said pole; and
   a cable coupled to and extending between said winch and said tube wherein operation of said winch elevates and lowers said foot support on said pole.

2. The device of claim 1, further comprising:
   a bar coupled to said tube, said bar being positioned in spaced relationship to said tube and in transverse relationship to said tube; and
   a hook coupled to said cable, said hook being removably engageable to said bar wherein said cable is removably coupled to said tube and retraction of said cable by said winch elevates said foot support.

3. The device of claim 1, further comprising a brace coupled to said post, said brace being positioned in spaced parallel relationship to said post, said brace being elongated, said brace having a length less than a length of said post, said brace having an L-shaped cross sectional shape transverse to a longitudinal axis of said brace.

4. A driver lift device comprising:
   a post, said post being elongated wherein said post is configured for being vertically mounted to a vehicle proximate an entry into a cab of the vehicle;
   a pole, said pole being elongated, a top end and a bottom end of said pole each being coupled to said post such that said pole is positioned in parallel spaced relationship to said post;
   a tube, said pole extending through said tube wherein said tube is slidable along said pole;
   a foot support coupled to said tube;
   a winch coupled to said top end of said pole;
   a cable coupled to and extending between said winch and said tube wherein operation of said winch elevates and lowers said foot support on said pole;
   a brace coupled to said post, said brace being positioned in spaced parallel relationship to said post, said brace being elongated, said brace having a length less than a length of said post, said brace having an L-shaped cross sectional shape transverse to a longitudinal axis of said brace; and
   said foot support comprising a corner being inset between opposite side edges of said foot support defining an alignment guide, said alignment guide being vertically aligned with said brace such that said alignment guide is complementary to and slides along said brace when said tube is elevated and lowered.

5. The device of claim 4, further comprising said foot support being lowerable to a position vertically spaced below a base end of said brace, said brace having an outwardly directed tab extending from one flange of said brace wherein said tab facilitates positioning of said alignment guide relative to said brace as said foot support is elevated towards said base end of said brace.

6. The device of claim 1, further comprising a handle coupled to and extending from said tube.

7. The device of claim 6, further comprising a control coupled to said handle, said control being operationally coupled to said winch wherein operation of said winch is controlled by manipulation of said control.

8. The device of claim 1, further comprising an upper plate coupled to and extending between said post and said top end of said pole, said winch being coupled to and positioned on a top surface of said plate.

9. The device of claim 1, further comprising said foot support comprising a planar upper surface.

10. The device of claim 1, further comprising an extension coupled between said foot support and said tube such that said foot support is positioned vertically below said tube and said bottom end of said pole when said tube is in a fully lowered position.

11. The device of claim 1, further comprising said pole having a polygonal cross-sectional shape transverse to a longitudinal axis of said pole, said tube having a complementary shape to said pole such that said tube is inhibited from twisting on said pole.

12. The device of claim 11, further comprising said polygonal cross-sectional shape being rectangular.

13. The device of claim 1, further comprising:

a hole extending through said pole, said hole being positioned proximate said top end of said pole;

an aperture extending through said tube, said aperture being positionable to align with said hole when said tube is elevated; and a locking pin insertable through said aperture and said hole wherein said tube is inhibited from sliding along said pole.

14. The device of claim 13, further comprising:

said locking pin being slidably coupled to said tube in alignment with said aperture; and a grip coupled to and extending from said locking pin wherein said grip is configured for facilitating manipulation of said locking pin.

15. The device of claim 14, further comprising said locking pin being biased to extend towards engagement with said pole.

16. A driver lift device comprising:

a post, said post being elongated wherein said post is configured for being vertically mounted to a vehicle proximate an entry into a cab of the vehicle;

a pole, said pole being elongated, said pole having a polygonal cross-sectional shape transverse to a longitudinal axis of said pole, a top end and a bottom end of said pole each being coupled to said post such that said pole is positioned in parallel spaced relationship to said post;

a brace coupled to said post, said brace being positioned in spaced parallel relationship to said post, said brace being elongated, said brace having a length less than a length of said post, said brace having an L-shaped cross sectional shape transverse to a longitudinal axis of said brace, said brace having an outwardly directed tab extending from one flange of said brace;

a tube, said pole extending through said tube wherein said tube is slidable along said pole, said tube having a complementary shape to said pole such that said tube is inhibited from twisting on said pole, said polygonal cross-sectional shape being rectangular;

a handle coupled to and extending from said tube;

a foot support coupled to said tube, said foot support comprising a planar upper surface and a corner being inset between opposite side edges of said foot support defining an alignment guide, said alignment guide being vertically aligned with said brace such that said alignment guide is complementary to and slides along said brace when said tube is elevated and lowered, said foot support being lowerable to a position vertically spaced below a base end of said brace wherein said tab facilitates positioning of said alignment guide relative to said brace as said foot support is elevated towards said base end of said brace;

an extension coupled between said foot support and said tube such that said foot support is positioned vertically below said tube and said bottom end of said pole when said tube is in a fully lowered position;

a winch coupled to said top end of said pole;

an upper plate coupled to and extending between said post and said top end of said pole, said winch being coupled to and positioned on a top surface of said plate;

a control coupled to said handle, said control being operationally coupled to said winch wherein operation of said winch is controlled by manipulation of said control;

a cable coupled to and extending between said winch and said tube wherein operation of said winch elevates and lowers said foot support on said pole;

a bar coupled to said tube, said bar being positioned in spaced relationship to said tube and in transverse relationship to said tube;

a hook coupled to said cable, said hook being removably engageable to said bar wherein said cable is removably coupled to said tube and retraction of said cable by said winch elevates said foot support;

a hole extending through said pole, said hole being positioned proximate said top end of said pole;

an aperture extending through said tube, said aperture being positionable to align with said hole when said tube is elevated;

a locking pin insertable through said aperture and said hole wherein said tube is inhibited from sliding along said pole, said locking pin being slidably coupled to said tube in alignment with said aperture, said locking pin being biased to extend towards engagement with said pole; and a grip coupled to and extending from said locking pin wherein said grip is configured for facilitating manipulation of said locking pin to slidably disengage from said hole in said pole.

* * * * *